United States Patent
Krüger et al.

(10) Patent No.: US 7,711,355 B1
(45) Date of Patent: May 4, 2010

(54) DEVICE USED IN A VEHICLE WHICH IS CONTROLLED BY VEHICULAR OPERATION TO AVOID DANGEROUS VEHICULAR OPERATION

(75) Inventors: Andreas Krüger, Bochum (DE); Hans Hansen, Kobenhaven (DK); Wolfgang Theimer, Bochum (DE); Klaus Kespohl, Bochum (DE); Mika Leppinen, Woburn, MA (US); Turkka Keinonen, Huhmari (FI); Maximiliano Roque-Cerna, Günzburg (DE); Anne Koppinen, Tampere (FI); Anne Kirjavainen, Espoo (FI)

(73) Assignee: Nokia Mobile Phones, Ltd., Espoo (FI)

( * ) Notice: Subject to any disclaimer, the term of this patent is extended or adjusted under 35 U.S.C. 154(b) by 0 days.

(21) Appl. No.: 09/621,085

(22) Filed: Jul. 21, 2000

(30) Foreign Application Priority Data

Jul. 21, 1999 (DE) ................................ 199 34 105

(51) Int. Cl.
*H04B 1/38* (2006.01)
(52) U.S. Cl. .................... 455/417; 455/418; 455/569.2; 455/238.1; 340/441
(58) Field of Classification Search ................ 455/417, 455/11.1, 456, 414, 414.1, 67.1, 67.11, 417.1, 455/418–420, 404.1, 238.1, 3.06, 458, 569.2, 455/456.1, 567; 381/108; 701/93; 340/441
See application file for complete search history.

(56) References Cited

U.S. PATENT DOCUMENTS

| | | | | |
|---|---|---|---|---|
| 5,027,432 A | * | 6/1991 | Skala et al. ............... | 455/238.1 |
| 5,483,692 A | * | 1/1996 | Person et al. ............ | 455/238.1 |
| 5,814,798 A | | 9/1998 | Zancho | |
| 5,953,677 A | * | 9/1999 | Sato ........................... | 455/574 |
| 6,044,262 A | * | 3/2000 | Hirayama ................ | 455/412.2 |
| 6,060,989 A | * | 5/2000 | Gehlot ...................... | 340/576 |
| 6,079,258 A | * | 6/2000 | List et al. ................... | 73/117.3 |
| 6,178,374 B1 | * | 1/2001 | Mohlenkamp .............. | 701/117 |
| 6,188,949 B1 | * | 2/2001 | Hahn et al. .................. | 701/93 |

(Continued)

FOREIGN PATENT DOCUMENTS

EP        4204996 A1       8/1993

(Continued)

*Primary Examiner*—George Eng
*Assistant Examiner*—Brandon J Miller
(74) *Attorney, Agent, or Firm*—Alston & Bird LLP

(57) ABSTRACT

In the current state of the art there are a number of operable devices 11, 12, 13 known that have an operating panel 14 through which a user of the device 11, 12, 13 can produce and/or change-existing operating states, Because of the fact that manual operation is often very complex and can also result in the distraction of the user in situations that require the full the attention of a user to be directed elsewhere, the invention increases the ease of operation and simultaneously reduces the amount of attention required to be paid to the devices 11, 12, 13. The invention uses a decision unit 15 that blocks or releases certain operating states of the operable device 11, 12, 13 based on the data received. The invention can be implemented, for example, so that a mobile telephone 11 installed in a vehicle 10 does not "transfer" any telephone calls or suppresses the making of telephone calls from within the vehicle 10 when the vehicle 10 is moving faster than a certain speed.

40 Claims, 2 Drawing Sheets

U.S. PATENT DOCUMENTS

| | | | |
|---|---|---|---|
| 6,233,448 B1 * | 5/2001 | Alperovich | 455/417 |
| 6,263,282 B1 * | 7/2001 | Vallancourt | 701/301 |
| 6,311,078 B1 * | 10/2001 | Hardouin | 455/567 |
| 6,393,301 B1 * | 5/2002 | Oda | 455/557 |
| 6,450,587 B1 * | 9/2002 | MacGregor et al. | 303/89 |
| 6,463,278 B2 * | 10/2002 | Kraft | 455/418 |
| 6,549,792 B1 * | 4/2003 | Cannon et al. | 455/550.1 |
| 6,553,130 B1 * | 4/2003 | Lemelson et al. | 382/104 |
| 6,687,497 B1 * | 2/2004 | Parvulescu et al. | 455/420 |

FOREIGN PATENT DOCUMENTS

| | | | |
|---|---|---|---|
| EP | 0 851 699 | * | 1/1998 |
| EP | 0 851 699 | A2 | 7/1998 |
| EP | 0 854 584 | A2 | 7/1998 |
| EP | 0 880 296 | A1 | 11/1998 |
| WO | WO 98/07265 | | 2/1998 |

* cited by examiner

DEVICE USED IN A VEHICLE WHICH IS CONTROLLED BY VEHICULAR OPERATION TO AVOID DANGEROUS VEHICULAR OPERATION

BACKGROUND OF THE INVENTION

1. Field of the Invention

The invention contributes to the safe and/or convenient use of operable devices in or under conditions that require the full the attention of a user to be directed elsewhere.

2. Description of the Prior Art

There are numerous operable devices known in the current state of the art that provide an operating panel through which a user of the device can produce and/or change existing operating states. Examples of such types of devices are telephones or stereos. These devices are characterized in that at least one button or knob must be operated to produce and/or change operating states, This may be acceptable when the user can direct his or her full attention to the operable device. However, it is often the case that the user cannot or will not direct any of his or her attention to the operable device due to other events or conditions. For example, if a telephone or car stereo is installed in a vehicle, it is not acceptable from a safety standpoint that the driver, while operating the vehicle, nevertheless makes a telephone call or changes a cassette.

The aspect of convenience as well as the safety aspect has been neglected in many operable devices. For example, if in a vehicle that is equipped with a permanently installed telephone, a user must enter the appropriate data when he wants calls to be forwarded. This is often deemed to be tedious and the user therefore refrains from doing this. Refraining from doing this does not have any consequences other than that the user cannot be reached. This is not the case, however, when a user accidentally uses his or her mobile telephone or laptop computer at a location where the use of such devices is prohibited for safety reasons.

It is also not acceptable for all incoming calls to a mobile telephone to be transferred to the user. This may be desirable in most cases, but in some cases may lead to problems when private calls are "transferred" to the user during a business call, for example.

Even if the problems presented in this context only relate to telephones and car stereos, it should be noted for the sake of completeness that these problems are also present in other operable devices. For example, adjusting the temperature of an air conditioning system or setting up a navigation system while driving is just as dangerous as operating a car phone.

SUMMARY OF THE INVENTION

The present invention implements the task of specifying an operable device that takes safety aspects as well as convenience aspects into consideration.

If, in accordance with the invention, there is a decision unit present that blocks or releases certain operating states of the operable device based on received data, then the detection of dangerous situations based on the data can be used to ensure that certain operating states cannot be executed and/or it is impossible to manually operate the operating panel, for example. The latter also results in a training effect that is not to be underestimated because restricting functionality, however it is accomplished, will help the user develop a better feel for dangerous situations and, due to his or her unsuccessful efforts to operate the device in dangerous situations, the user will automatically refrain from operating the device in such situations.

DESCRIPTION OF THE PREFERRED EMBODIMENTS

The invention is now explained in more detail based on the drawings.

Figure 1:
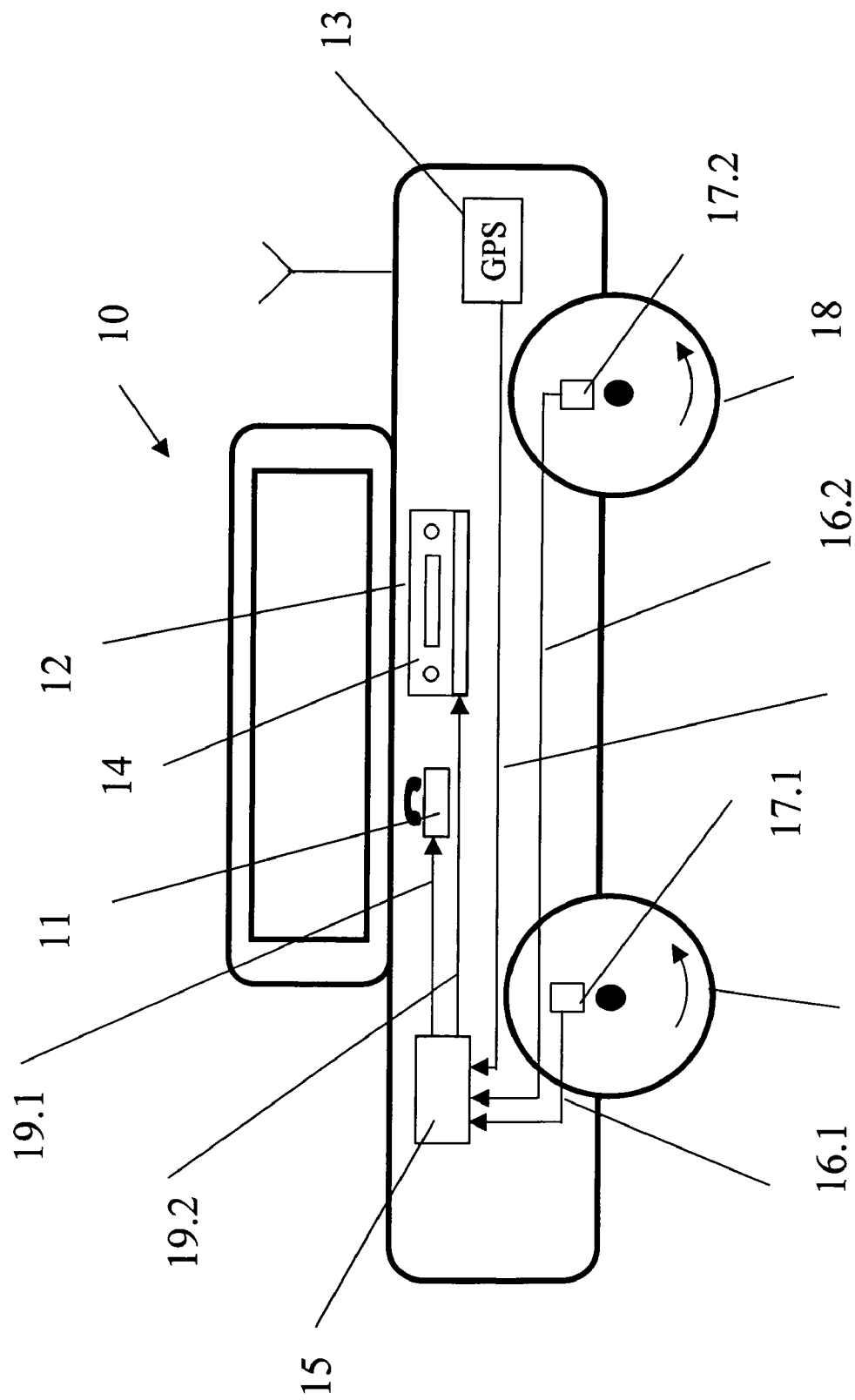
FIG. 1 is a motor vehicle.

FIG. 1 shows a diagram of a motor vehicle 10. This motor vehicle is equipped with a car phone 11, a car radio 12 and a navigation system 13. The car phone 11, the car radio 12 and the navigation system 13 each fulfill the definition of the term "operable device". For the sake of clarity, however, the operating panel 14 is only shown in more detail for the car radio 12.

There is also a decision unit 15 present. This decision unit 15 is connected to sensors 17.1, 17.2 via the wires 16.1, 16.2. Sensor 17.1 has the task of determining the speed of the vehicle 10, The determination of when the vehicle brakes (not shown) have been activated is done via sensor 17.2. Even though the diagram in FIG. 1 is limited to just two sensors 17, this does not mean that the invention is limited to these two sensors 17. On the contrary, other sensors (not illustrated) may be used which determine when the steering wheel has been turned or that determine the angle of inclination of the vehicle 10, for example. The type of sensors 17 which are used are left up to the expert. The arrangement of the sensors 17.1, 17.2 is not limited to the wheels 18 of the vehicle 10 as shown in FIG. 1. For example, it is possible in a different example (not shown) that the sensor 17.1 determines the speed of the vehicle 10 using the tachometer (not shown) or that existing speed data, when already available in the vehicle 10, is fed directly to the decision unit 15.

Furthermore, the decision unit 15 is connected to the car phone 11 via a data line 19.1 and is connected to the car radio 12 via a data line 19.2.

To better understand the invention it is assumed that the vehicle 10 is moving on a highway at a speed between 100 and 140 kin/h. Furthermore, it is assumed that operating the car phone 11 and/or the car radio 12 at speeds over 130 km/h is considered dangerous.

Example 1

In this example only sensor 17.1 is present, and it continuously transmits speed values to the decision unit 15. The decision unit 15 is designed as a threshold switch (not presented in more detail). If the threshold switch is provided with speed values from sensor 17.1 that are over the speed of 130 km/h that is considered dangerous, then a signal is triggered and is transmitted on the data lines 19.1, 19.2. This signal then blocks the operation of the operating panel 14 on the car radio 12 and prevents telephone calls from being made in the vehicle 10 and from being received in the vehicle 10.

Just for the sake of completeness it should be noted that it is not necessary for the same speed limitations to apply to both the car radio 12 and the car phone 11. For example, making a telephone call can be prevented at speeds higher than 100 km/h while the operability of the car radio 12 is only restricted at speeds over 120 km/h. Even the various operating states of the car phone 11 could be dependent on the corresponding speed. For example, making a telephone call from the vehicle 10 could be prevented at speeds higher than 50 km/h while receiving a telephone call is allowed at speeds of up to 160 km/h, especially when the telephone is equipped with a hands-free operation accessory.

If the telephone function of the car phone 12 or the operability of the car radio 11 is suspended due to the current vehicle speed, the driver can be optically or acoustically informed of this state at the same time the signal is transmitted on the data lines 19.1, 19.2. In the context of the car phone 12, the unit could be designed so that the driver is also notified of incoming calls even if the current speed prevents the driver from accepting the call, In this case the driver may be provided the opportunity to reduce the speed in order to be able to accept the call. The unit can also be built so that incoming telephone calls are immediately forwarded to a different telephone at speeds where making or receiving a telephone call is prevented. Finally, the unit could be designed so that the number of the caller is stored when the vehicle 10 is moving at a speed higher than the speed at which making and receiving a telephone call is prevented. If the speed of the vehicle 10 drops below the critical value later on, the number stored could be used to automatically dial the caller.

The decision unit 15 can also be designed so that over a time period t the fluctuation of the driving speed is measured and used as a gauge for determining the operability or usability of operable devices. For example, if a speed of 100 km/h with a fluctuation of +/−5 km/h is determined during the time period t, then the demands placed on the driver could be considered low enough to allow the driver to make telephone calls, in contrast to when there is a fluctuation of +/−30 km/h.

If the vehicle 10 is equipped with a navigation system 13 that specifies the way to the destination for the driver through corresponding announcements, then the decision unit 15 can also be modified so that the corresponding announcements must be output at least twice at speeds over a critical speed, while at lower speeds the announcement only needs to be output once.

Even though the speed-dependent usability of the operable devices 11, 12 discussed in Example I already makes an undisputed contribution to safety, this type of influence on the operating states is very static because, from a safety standpoint, it may be safe to make a telephone call at a speed of 130 km/h when driving smoothly, while doing so in another situation at speeds higher than 70 km/h may present a safety hazard. For this reason, a more flexible solution is discussed in the context of Example 2.

Example 2

To realize this, an initial example is given in which the driving speed is not used immediately to influence the operating states of the operable devices 11, 12, rather the driving speeds are averaged over a time period t within the decision unit 15. Only after this average value is over the speed determined to be critical will a corresponding signal be output on the data lines 19.1, 19.2.

In a second example not only is sensor 17.1 active, but also sensor 17.2. For example, if it is determined that the actual driving speed is above one of the critical values stored in the decision unit but sensor 17.2, which monitors the activation of the brakes, does not notify the decision unit 15 of a braking maneuver over a time period t1, then this can be used as an indicator that in spite of the current speed the operable devices 11, 12 are still operable or usable.

In addition to the vehicle-specific conditions (speed, braking response), external conditions can also be taken into consideration as influencing factors. For example, if the vehicle is equipped with a receiving unit 20 with which traffic and/or weather information can be received, then this information can be used to block or release the operable devices 11, 12, 13. To do this, it is necessary that the data received by the receiving unit 20 is transmitted to the decision unit 15 (not shown in FIG. 1). It is very advantageous in this context when there is a navigation system 13 present because the corresponding information can be restricted to the current location due to the knowledge of the current location of the vehicle. In addition, the presence of a navigation system 13 is also advantageous because important knowledge can be gained that can be used to block operating states due to the knowledge of the street currently being used or of the streets that will soon be used. If only the traffic information and navigation system 13 are used, objective knowledge of whether or not telephone calls are to be permitted in the near future can be gained, for example.

Just for the sake of completeness it should be noted that the decision unit 15 can also be designed so that all values received by the sensors 17 are evaluated and converted into a driving profile that is then used to decide if the operable devices 11, 12 are usable after comparison with a driving profile stored in the decision unit. The driving profile stored in the decision unit 15 could also be designed to learn. This means that the decision unit 15 adapts the driving profile stored in it to the abilities of the corresponding driver, for example, based on the values received by the sensors 17. This ensures that when the sensors 17 detect values that allow drawing the conclusion that the driver has fast reactions, such a driver can still use the operable devices 11, 12 in somewhat more critical situations than a driver with slower reactions.

Even if the navigation system 13 in FIG. 1 does not have any operable device like the car phone 11 and the car radio 12, but functions as a sensor (indicated in FIG. 1 by the arrow from the navigation 13 to decision unit 15), it should be pointed out that an operable panel will be blocked in a similar manner as the operating panel 14 of the car phone 11, if in another embodiment (not illustrated) the navigation system 13 is equipped with an operable panel.

If the navigation system 13 functions as a sensor in accordance with the diagram in FIG. 1, then, when a vehicle is driven on a difficult stretch of road such as a mountain road or on roads prone to accidents, a corresponding signal can be sent to the decision unit 15 via wire 16.3 and can be used to block the operable devices 11, 12 if necessary, for example.

In addition the navigation system 13 can also be used to improve convenience. Because the navigation system always knows the location of the vehicle, this information can easily be used to redirect calls. For example, if the vehicle is parked in front of the office or a private residence, the corresponding location data is transferred to the car phone 12. This information can be used to activate call forwarding so that the user can automatically have his or her calls to the car phone 12 forwarded to the office or private telephone number, depending on the current location of the vehicle.

Figure 2:
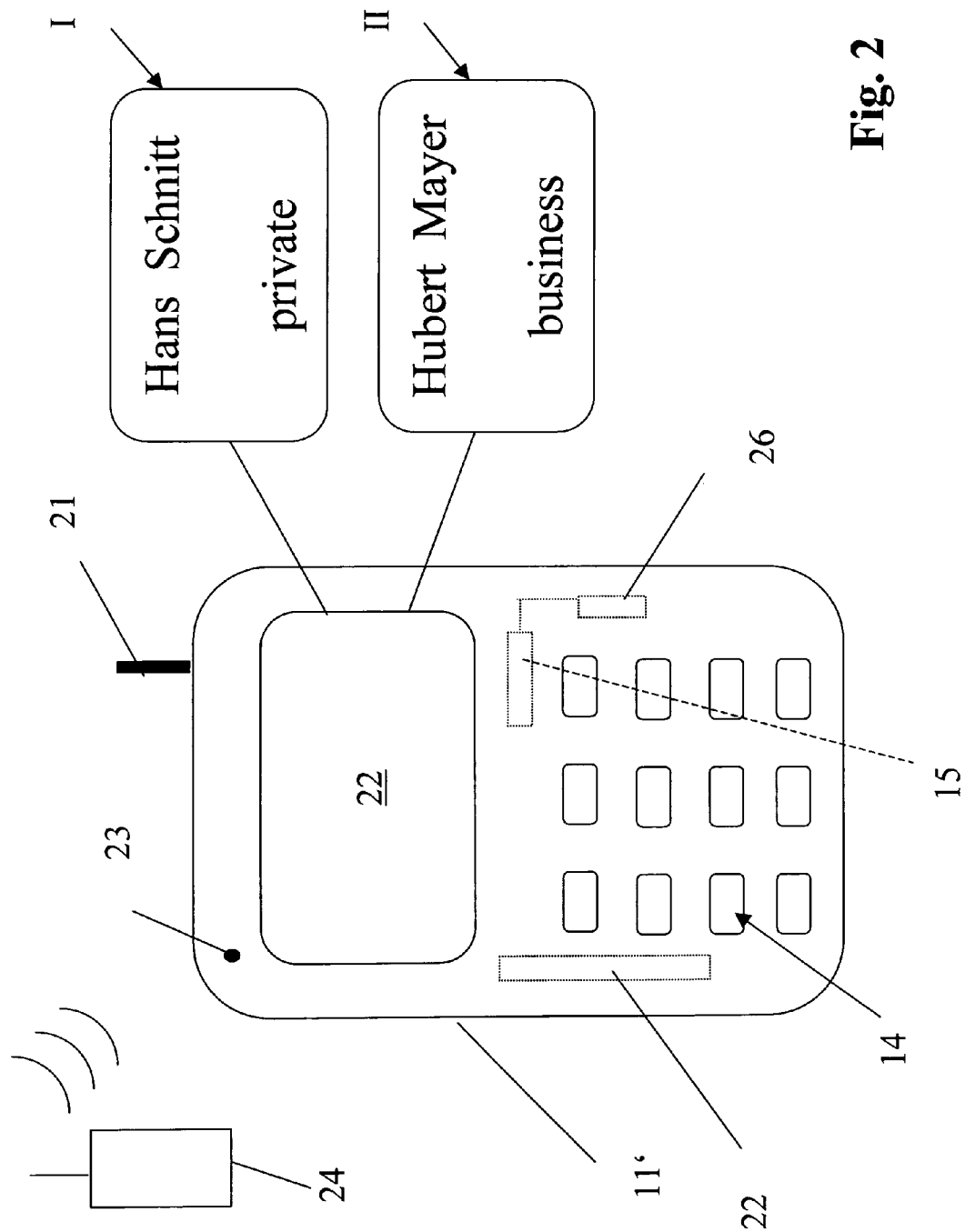
FIG. 2 a mobile telephone

FIG. 2 shows a mobile telephone 11'. This mobile telephone is equipped with a display 22, an operating panel 14 and an antenna 21. In addition there is a memory unit inside the mobile telephone 11' in which the user can store the name, telephone number and type of telephone.

Furthermore, the mobile telephone 11' also contains a decision unit 15 that is connected to a clock 26 in the first example. If, for example, the decision unit 15 is informed using a general input that business calls are only allowed between 8 AM and 6 PM, then a telephone call from Hans Schnitt (see display image I) would only be "transferred" to the user between 6 PM and 8 AM while Hubert Mayer (see display image II) can also reach the user between 8 AM and 6 PM due to the "business" annotation. In addition to the clock 26, the decision unit 15 can also be connected to a calendar (not shown) in order to block business calls on the weekend, for example. The mobile telephone shown in FIG. 2 can also, of course, be modified so that users whose data has been stored in memory 22 and marked "private" can have telephone calls they make during the blocked period (8 AM to 6 PM) forwarded to the user's private telephone.

The reference mark 23 designates a sensor for the mobile telephone 11'. This sensor 23 is connected to the decision unit 15 and has the task of receiving signals sent out from a remote sender 24. This sender 24 can be installed in aircraft, offices, hospitals, private dwellings or at gas stations, for example. If the sensor 23 receives the signal sent by the particular sender 24, then this could cause the mobile telephone 11' to not send out any more signals through the antenna 21 and not display incoming calls any more. The latter is practical in aircraft, for example, where airline companies have officially announced that mobile telephones 11' that are ready for operation cause problems. If such a sender 24 is installed in offices or private dwellings, then it is ensured that unwanted telephone calls are not "transferred" to the user depending on where the mobile telephone 11' is located at that moment.

Naturally, the mobile telephone 11' shown in FIG. 2 can also be equipped or connected to a GPS module (not shown) that determines the corresponding location of the mobile telephone 11' when it is in use. In this case the mobile telephone 11' is set up, for example, so that when location data is collected from which it can be concluded that the mobile telephone 11' is in use in an office or corporate building, no private calls are transferred to the user, and when in use at home, no business calls are transferred to the user. Even a combination of the mobile telephone 11' and the GPS module can be designed so that when a telephone number is stored when the user is in an office, the number can immediately be marked as a "business" number based on the location information obtained from the GPS module, for example, so that telephone calls from the caller whose number was just stored are only "transferred" to the user when the GPS module recognizes that the mobile telephone 11' is currently located in the office.

The discussion pertaining to making and receiving telephone calls in the classical sense is also naturally applicable to services that are limited to just data transfers. This means that a user who does not want to receive any or only wants to receive specific faxes, e-mails, short messages via SMS and/ or information from the Internet via the Mobil Media Mode (WWW:MMM) on his or her mobile telephone 11' during non-office hours, for example, can block these as described above using clock-based or GPS control.

Finally, we would like to point out that if the user has blocked the "transfer" of business calls or data to his or her residence, then this can be implemented so that the corresponding transmissions are not displayed to the user. However, to prevent the sending of superfluous transmissions that are not shown to the user anyway, it can also be specified that when time or location events arise that are to block or activate certain services according to the user's specifications, the provider is automatically notified of these time or location events to reduce the load on the network.

What is claimed is:

1. A system, comprising:
   at least two operable devices with operating states that are producible or changeable, for usage in a vehicle, with an operating panel configured to allow a user to cause at least one of producing existing operating states or changing existing operating states of a respective one of the operable devices;
   at least one sensor in the vehicle; and
   a decision unit, coupled to the operating panel of the respective operable device, which receives data from said at least one sensor for determining vehicle-specific conditions, at least including the vehicle speed, over a time period of vehicle operation by evaluating the received sensor data and which converts the vehicle-specific conditions into a driving profile indicating an actual driving situation of the vehicle and blocks or releases the existing operating states of the respective operable device according to whether the actual driving situation is detected to be dangerous or non-dangerous, said detection being made on a basis of the driving profile;
   wherein different speed limitations apply to different ones of said at least two operable devices or different operating states of one of said at least two operable devices in said detection if the actual driving situation is dangerous or non-dangerous.

2. A system according to claim 1, wherein the operable device is operable to perform at least one of receiving or transmitting data.

3. A system according to claim 1, comprising:
   equipment which collects information on at least one of conditions or states under which or by which the operable device is currently being operated, and transmits the information as data to the decision unit.

4. A system according to claim 2, comprising:
   equipment which collects information on at least one of conditions or states under which or by which the operable device is currently being operated, and transmits the information as data to the decision unit.

5. A system according to claim 1, comprising:
   a receiving unit; and wherein
   data is received by the receiving unit and is transmitted to the decision unit to be used alone or together with other data to control the blocking of the operating states or releasing of the operating states of the operable device.

6. A system according to claim 2, comprising:
   a receiving unit; and wherein
   data is received by the receiving unit and is transmitted to the decision unit to be used alone or together with other data to control the blocking of the operating states or releasing of the operating states of the operable device.

7. A system according to claim 3, comprising:
   a receiving unit; and wherein
   data is received by the receiving unit and is transmitted to the decision unit to be used alone or together with other data to control the blocking of the operating states or releasing of the operating states of the operable device.

8. A system according to claim 4, comprising:
   a receiving unit; and wherein
   data is received by the receiving unit and is transmitted to the decision unit to be used alone or together with other data to control the blocking of the operating states or releasing of the operating states of the operable device.

9. The system according to claim 1, wherein a driver of the vehicle is notified about incoming calls even if the actual driving situation is dangerous with respect to the driver accepting the call.

10. The system according to claim 1, further comprising a navigation system, wherein the decision unit is configured such that announcements of the navigation system are to be outputted at least twice at speeds over a critical limit.

11. The system according to claim 1, further comprising a navigation system, wherein corresponding location data of the vehicle is transferred to a car phone in order to activate call forwarding depending on a current location of the vehicle.

12. The system according to claim 1, wherein said vehicle-specific conditions further comprise at least one of speed fluctuation, brake activation, steering wheel turning, and inclination angle of the vehicle.

13. A system, comprising:
at least two operable devices with operating states that are producible or changeable, said devices configured for use in a vehicle, with an operating panel configured to allow a user to cause at least one of producing existing operating states or changing existing operating states of a respective one of the operable devices;
at least one sensor in the vehicle; and
a decision unit, coupled to the operating panel of the respective operable device, which receives driving speed data from said at least one sensor for detection of vehicle-specific conditions by measuring fluctuation of the driving speed of the vehicle over a time period and blocks or releases the existing operating states of the respective operable device based on the measured fluctuation;
wherein different speed limitations apply to different ones of said at least two operable devices or different operating states of one of said at least two operable devices in said detection if the actual driving situation is dangerous or non-dangerous.

14. A system according to claim 13, wherein the operable device is operable to perform at least one of receiving or transmitting data.

15. A system according to claim 13, comprising:
equipment which collects information on at least one of conditions or states under which or by which the operable device is currently being operated, and transmits the information as data to the decision unit.

16. A system according to claim 14, comprising:
equipment which collects information on at least one of conditions or states under which or by which the operable device is currently being operated, and transmits the information as data to the decision unit.

17. A system according to claim 13, comprising:
a receiving unit; and wherein
data is received by the receiving unit and is transmitted to the decision unit to be used alone or together with other data to control the blocking of the operating states or releasing of the operating states of the operable device.

18. A system according to claim 14, comprising:
a receiving unit; and wherein
data is received by the receiving unit and is transmitted to the decision unit to be used alone or together with other data to control the blocking of the operating states or releasing of the operating states of the operable device.

19. A system according to claim 15, comprising:
a receiving unit; and wherein
data is received by the receiving unit and is transmitted to the decision unit to be used alone or together with other data to control the blocking of the operating states or releasing of the operating states of the operable device.

20. A system according to claim 16, comprising:
a receiving unit; and wherein
data is received by the receiving unit and is transmitted to the decision unit to be used alone or together with other data to control the blocking of the operating states or releasing of the operating states of the operable device.

21. The system according to claim 13, wherein a driver of the vehicle is notified about incoming calls even if the actual driving situation is dangerous with respect to the driver accepting the call.

22. The system according to claim 13, further comprising a navigation system, wherein the decision unit is configured such that announcements of the navigation system are to be outputted at least twice at speeds over a critical limit.

23. The system according to claim 13, further comprising a navigation system, wherein corresponding location data of the vehicle is transferred to a car phone in order to activate call forwarding depending on a current location of the vehicle.

24. The system according to claim 13, wherein said vehicle-specific conditions further comprise at least one of speed fluctuation, brake activation, steering wheel turning, and inclination angle of the vehicle.

25. A method for controlling at least two operable devices, which are used in a vehicle, comprising:
facilitating control of an operating panel by a user to cause at least one of producing existing operating states or changing existing operating states of a respective one of the operable devices;
receiving data from at least one sensor in a decision unit which is coupled to the operating panel, said data at least including information about the vehicle speed;
determining vehicle-specific conditions over a time period of vehicle operation by evaluating the received sensor data;
converting the vehicle-specific conditions into a driving profile indicating an actual driving situation of the vehicle; and
blocking or releasing the existing operating states of the respective operable device according to whether the actual driving situation is detected to be dangerous or non-dangerous, said detection being made on a basis of the driving profile;
wherein different speed limitations apply to different ones of said at least two operable devices or different operating states of one of said at least two operable devices in said detection if the actual driving situation is dangerous or non-dangerous.

26. The method according to claim 25, wherein a driver of the vehicle is notified about incoming calls even if the actual driving situation is dangerous with respect to the driver accepting the call.

27. The method according to claim 25, wherein said vehicle is equipped with a navigation system, wherein announcements of the navigation system are outputted at least twice at speeds over a critical limit.

28. The method according to claim 25, wherein said vehicle is equipped with a navigation system, wherein corresponding location data of the vehicle is transferred to a car phone in order to activate call forwarding depending on the current location of the vehicle.

29. The method according to claim 25, wherein said data further comprises information about at least one of speed fluctuation, brake activation, steering wheel turning, and inclination angle of the vehicle.

30. A decision unit coupled to operating panels of at least two operable devices with operating states that are producible or changeable, which are used in a vehicle, the decision unit comprising an input configured to receive signals from at least one sensor present in the vehicle;
the decision unit configured to determine vehicle-specific conditions, at least including the vehicle speed, over a time period of vehicle operation by evaluating the received sensor signal and for converting the vehicle-specific conditions into a driving profile indicating an actual driving situation of the vehicle, wherein the decision unit is configured to block or release an existing operating state of a respective one of the operable devices according to whether the actual driving situation is detected to be dangerous or non-dangerous, said detection being made on a basis of the driving profile; and an output configured to output an output signal, which is used for changing the operating states of the respective operable device connected to the decision unit;

wherein different speed limitations apply to different ones of said at least two operable devices or different operating states of one of said at least two operable devices in said detection if the actual driving situation is dangerous or non-dangerous.

31. The decision unit according to claim 30, wherein the driver of the vehicle is notified about incoming calls even if the actual driving situation is dangerous with respect to the driver accepting the call.

32. The decision unit according to claim 30, wherein said vehicle is equipped with a navigation system, wherein the decision unit is configured such that announcements of the navigation system are to be outputted at least twice at speeds over a critical limit.

33. The decision unit according to claim 30, wherein said vehicle is equipped with a navigation system, wherein corresponding location data of the vehicle is transferred to the car phone in order to activate call forwarding depending on the current location of the vehicle.

34. The decision unit according to claim 30, wherein said vehicle-specific conditions further comprise at least one of speed fluctuation, brake activation, steering wheel turning, and inclination angle of the vehicle.

35. An apparatus configured to be coupled to operating panels of at least two operable devices, including at least a car radio and car phone, with operating states that are producible or changeable, the apparatus comprising:

a decision unit configured for usage in a vehicle, the decision unit is configured to receive driving speed data from at least one sensor present in the vehicle;

the decision unit configured to determine vehicle-specific conditions by measuring fluctuation of the driving speed of the vehicle over a time period;

wherein the decision unit is configured to block or release the existing operating states of a respective one of the operable devices based on the measured fluctuation;

wherein different speed limitations apply to different ones of said at least two operable devices or different operating states of one of said at least two operable devices in said detection if the actual driving situation is dangerous or non-dangerous.

36. An apparatus according to claim 35, further comprising:

an output for outputting an output signal, which is used for changing the operating states of the respective operable device connected to the decision unit.

37. The decision unit according to claim 35, wherein the driver of the vehicle is notified about incoming calls even if the actual driving situation is dangerous with respect to the driver accepting the call.

38. The decision unit according to claim 35, wherein said vehicle is equipped with a navigation system, wherein the decision unit is configured such that announcements of the navigation system are to be outputted at least twice at speeds over a critical limit.

39. The decision unit according to claim 35, wherein said vehicle is equipped with a navigation system, wherein corresponding location data of the vehicle is transferred to the car phone in order to activate call forwarding depending on the current location of the vehicle.

40. The decision unit according to claim 35, wherein said vehicle-specific conditions further comprise at least one of speed fluctuation, brake activation, steering wheel turning, and inclination angle of the vehicle.

* * * * *